United States Patent [19]

Helm

[11] 4,397,627
[45] Aug. 9, 1983

[54] APPARATUS FOR MOLDING A RECORDED DISC

[75] Inventor: James H. Helm, Elwood, Ind.

[73] Assignee: RCA Corporation, New York, N.Y.

[21] Appl. No.: 359,424

[22] Filed: Mar. 18, 1982

[51] Int. Cl.³ .............................................. B29C 17/00
[52] U.S. Cl. ...................................... 425/290; 249/79; 264/107; 425/810
[58] Field of Search ............... 425/290, 548, 552, 810; 264/106, 107, 328.14, 328.16; 249/79

[56] References Cited

U.S. PATENT DOCUMENTS

| | | | |
|---|---|---|---|
| 3,918,875 | 11/1975 | Phillipson | 425/810 |
| 4,085,178 | 4/1978 | McNeely et al. | 264/106 |
| 4,334,849 | 6/1982 | Bock | 425/810 |
| 4,340,353 | 7/1982 | Mayer | 425/548 |

FOREIGN PATENT DOCUMENTS 1187968  4/1970  United Kingdom .

Primary Examiner—Thomas P. Pavelko
Attorney, Agent, or Firm—Birgit E. Morris; Donald S. Cohen

[57] ABSTRACT

A center plate for an apparatus for molding recorded discs is disclosed which includes a cylindrical body having an internal recess and a plug secured across the bottom end of the recess. The plug has a pair of passages therethrough opening into the internal recess. An adapter is secured to the plug. The adapter has a pair of ports and a separate universal connection between each of the ports and a separate one of the passages in the plug. This provides for a flow of a heat control medium through the center plate and permits ease of connecting pipes to the ports to provide the flow of the heat control medium.

9 Claims, 4 Drawing Figures

APPARATUS FOR MOLDING A RECORDED DISC

BACKGROUND OF THE INVENTION

The present invention relates to an apparatus for molding a recorded disc and particularly to such an apparatus which includes an internally heated center plate for securing a stamper to the mold plate.

An apparatus suitable for molding recorded discs and particularly high density recorded discs, such as capacitive electronic discs (CED), is described in copending applications for U.S. Letters Patent of Michael Lee McNeely, Ser. No. 093,012, filed Nov. 9, 1979, entitled Apparatus for Producing Disc Records Having Molded-in Center Holes, and Robert Winfield Chambers et al, Ser. No. 187,161, filed Sept. 15, 1980, entitled Apparatus for Molding a Recording Disc, which are incorporated herein by rererence. In general, the apparatus of each of these applications includes a pair of opposed mold plates having recesses in their opposed surfaces. At least one of the mold plates is movable toward the other to bring the recesses together to form a mold cavity of the desired shape and size for the recorded disc. On the opposed surfaces of the mold plates are stampers. Each stamper is a thin metal plate having a central hole therethrough and a surface relief pattern on one surface which is the negative of the pattern to be formed in the recorded disc. The outer edge of each stamper is secured to its respective mold plate by a hold down ring. The center hole in each stamper is in alignment with a center hole in its respective mold plate and a center plate fits into the aligned holes and secures the inner edge of the stamper to the mold plate. A center hole forming pin is slidably mounted in a passage in the center plate in the upper mold plate. The bottom center plate has a raised central portion which mates with the bottom of the center hole forming pin to form a center hole in the molded recorded disc.

During the molding of a disc, the mold plates and stampers are first heated by passing steam through passages in the mold plates. The center hole forming pin is likewise heated by passing steam through a passage in the pin. Later in the molding cycle the mold plates, stampers and center hole forming pin are cooled by passing water through the respective passages. In order to achieve a uniform heating across the entire mold cavity, it has been found desirable to also heat the center plate of the bottom mold plate. Attempts have been made to attach a heater to the end of the bottom center plate, but this has not been satisfactory because it heats the center plate by conduction, which is too slow. Therefore, it would be desirable to have a center plate which is directly heated, such as by a flow of steam therethrough. However, because of the manner of securing the bottom center plate in the bottom mold plate, it is difficult to connect steam inlet and outlet pipes to the end of the center plate to achieve the direct heating of the center plate.

SUMMARY OF THE INVENTION

An apparatus for molding a recorded disc includes a pair of mold plates having opposed surfaces and central openings therethrough from the opposed surfaces. A center plate is in each of the openings for securing the inner edge of a stamper to the respective mold plate. One of the center plates has an internal passage for receiving a heat control medium. The center plate also includes inlet and outlet passages for permitting the flow of the heat control medium into and out of the internal passage. An adapter is attached to the center plate. The adapter has an inlet port, an outlet port and means for universally connecting the inlet and outlet ports to the inlet and outlet passages respectively of the center plate.

DETAILED DESCRIPTION OF THE PREFERRED EMBODIMENT

Figure 1:
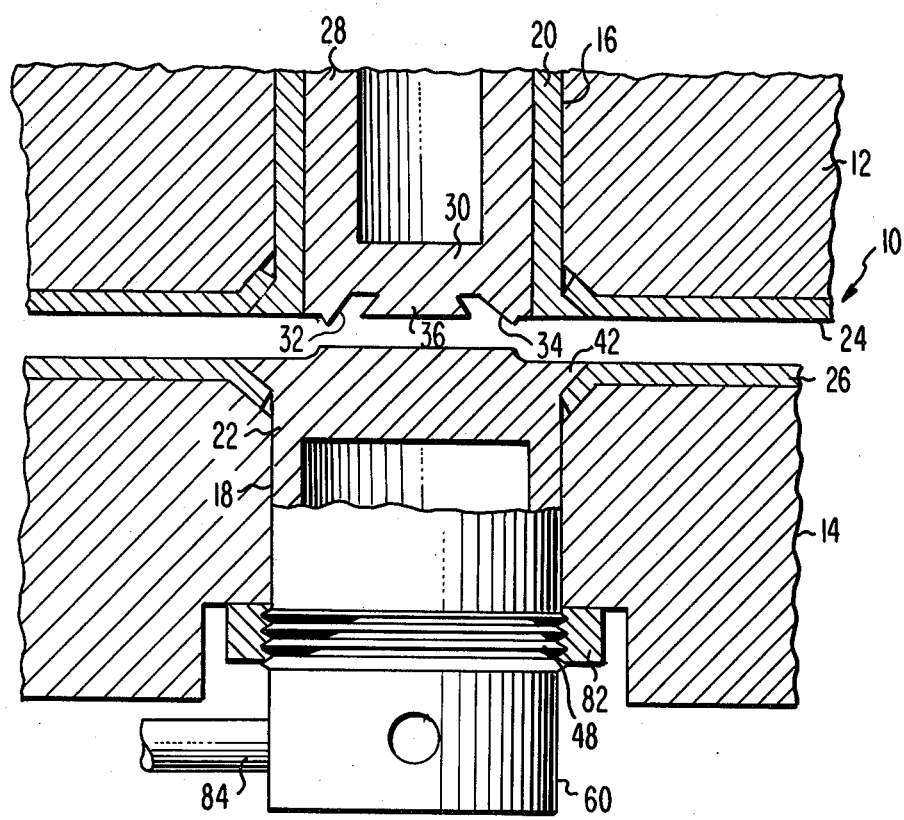
FIG. 1 is a sectional view of a portion of a molding apparatus incorporating the present invention.

Referring initially to FIG. 1, an apparatus for molding a recorded disc which incorporates the present invention is generally designated as 10. The molding apparatus 10 includes upper and lower mold plates 12 and 14 which are mounted in a press (not shown) so that at least one of them is movable toward and away from the other. The mold plates 12 and 14 have aligned center openings 16 and 18 respectively therethrough in which are mounted center plates 20 and 22 respectively. Stampers 24 and 26 are mounted on the opposed surfaces of the mold plates 12 and 14 respectively. The stampers 24 and 26 are thin metal plates having on the surface thereof the negative of the impression to be applied to the surface of the molded recorded disc. The stampers 24 and 26 are secured at their inner edges to the mold plates 12 and 14 by the center plates 20 and 22 respectively.

A center hole forming pin 28 extends through and is slidable in the center plate 20 of the upper mold plate 12. The center hole forming pin 28 is an elongated, hollow, cylindrical rod having a closed end 30. The center hole forming pin 28 has an outer diameter slightly larger than the diameter of the hole to be formed in the recorded disc. A hub 32 extends from the front end of the center hole forming pin 28 and is of a diameter substantially equal to the diameter of the hole to be formed in the recorded disc and of a length equal to one-half the thickness of the recorded disc to be molded. As shown, the hub 32 has a recess 34 in its surface and a nub 36 projects from the bottom of the recess 34.

Figure 2:
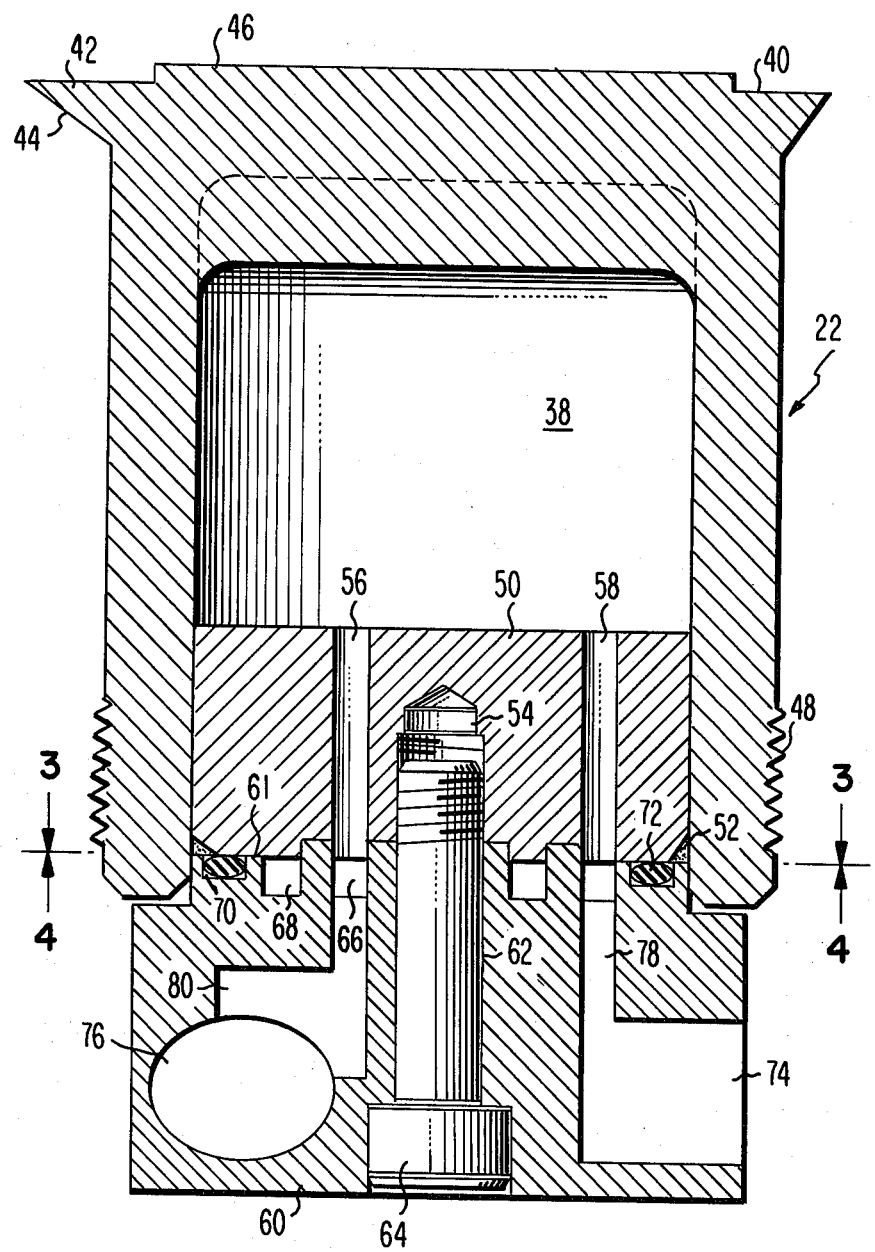
FIG. 2 is a sectional view of the center plate incorporating the present invention.
Figure 3:
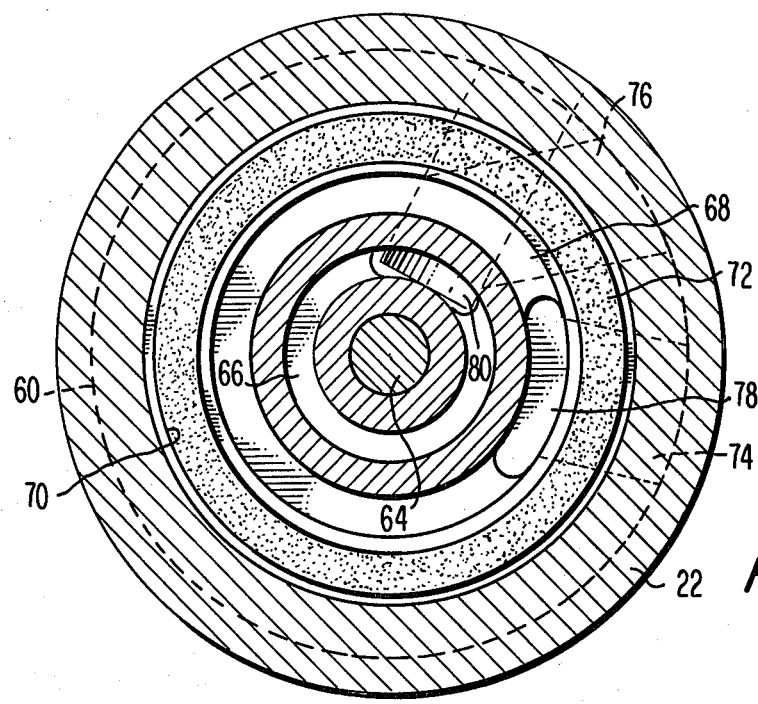
FIG. 3 is a sectional view taken along line 3—3 of FIG. 2.
Figure 4:
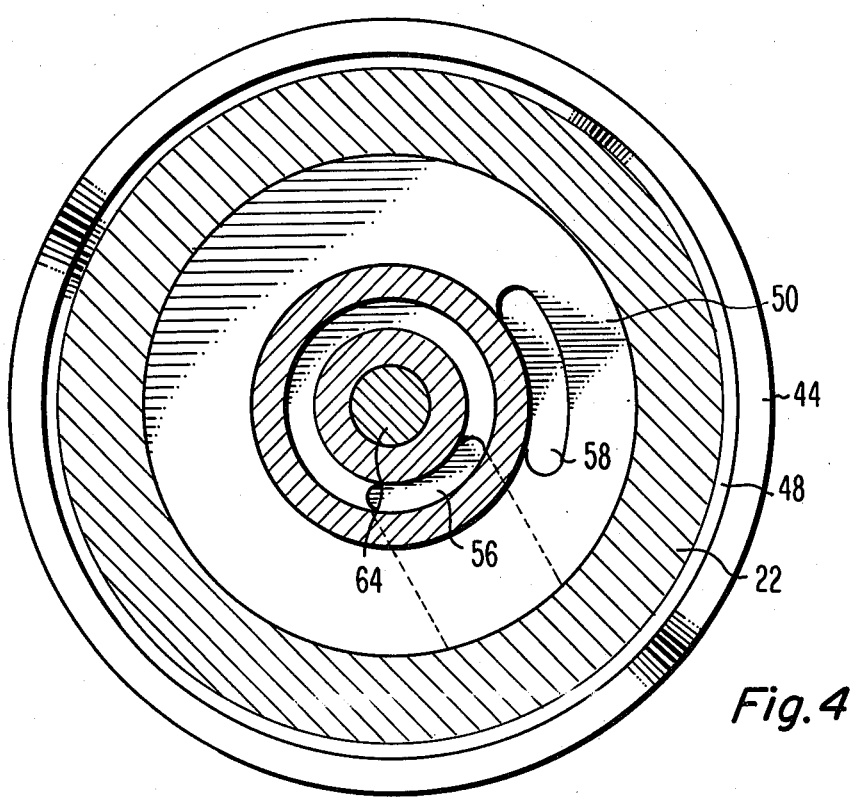
FIG. 4 is a sectional view taken along line 4—4 of FIG. 2.

As shown in FIG. 2, the center plate 22 in the lower mold plate 14 is cylindrical and has an internal recess 38 therein extending longitudinally from its bottom end to a point spaced from its top end surface 40. An annular flange 42 projects radially outwardly from the lower center plate 22 adjacent the top surface 40. The flange 42 has a tapered outer surface 44 which engages the edge of the stamper 26 to secure the stamper 26 to the lower mold plate 14. A cylindrical hub 46 projects upwardly from the upper surface 40. The hub 46 is of a diameter equal to that of the hub 32 on the center hole forming pin 28 and is of a height substantially equal to one-half the thickness of the molded recorded disc. The hub 46 mates with the hub 32 of the center hole forming pin 28 to form the center hole in the recorded disc being molded. The cylindrical outer surface of the lower center plate 22 has a threaded portion 48 adjacent the bottom end of the center plate.

A plug 50 is within and extends across the internal recess 38 adjacent to but spaced from the bottom end of the lower center plate 22. The plug 50 is secured to the center plate 22, such as by a weld 52. The plug 50 has a blind threaded hole 54 in the center of its bottom surface. A pair of passages 56 and 58 extend longitudinally completely through the plug 50. The passages 56 and 58 are positioned at different radial distances from the center of the plug 50.

An adapter 60 has its top surface 61 seated against the bottom surface of the plug 50. A hole 62 extends longitudinally through the center of the adapter 60 and is in alignment with the threaded hole 54 in the plug 50. A bolt 64 extends through the hole 62 and is threaded in the plug hole 54 to secure the adapter 60 to the plug 50. The adapter 60 has three concentric, circular grooves 66, 68 and 70 in its top surface 61. The inner groove 66 is of a radius equal to the radial distance of the passage 56 from the center of the plug 50. The middle groove 68 is of a radius equal to the radial distance of the passage 58 from the center of the plug 50. The outer groove 70 contains a sealing ring 72. If desired, additional sealing rings may be provided between the inner groove 66 and the bolt hole 62 and between the inner groove 66 and the middle groove 68. A pair of spaced port openings 74 and 76 are provided in the peripheral surface of the adapter 60. The port opening 74 is connected to the middle groove 68 by a passage 78, and the port opening 76 is connected to the inner groove 66 by a passage 80.

As shown in FIG. 1, the center plate 22 is inserted in the opening 18 in the lower mold plate 14 and is secured therein by a nut 82 which is threaded around the threaded portion 48 of the center plate 22. The tapered surface 44 of the flange 42 engages the inner edge of the stamper 26 to secure the inner edge of the stamper 26 to the mold plate 14. After the center plate 22 is mounted on the mold plate 14, the mold plate 14 can be mounted in a press. Hoses or pipes 84 (only one of which is shown in FIG. 1) are then connected to the ports 74 and 76 of the adapter 60. The hoses 84 are connected to a source of the heat control medium so as to provide a flow of the heat control medium through the recess 38 in the center plate 22. One of the ports, such as the port 74, will act as an inlet port for the heat control medium. The heat control medium will flow from the inner port 74 through the passage 78 to the groove 68 and then through the passage 58 in the plug 50 to the recess 38. The other port 76 will then act as an outlet port so that the heat control medium in the recess 38 will flow through the passage 56 in the plug 50 to the recess 66 in the adapter. From the recess 66 the heat control medium will flow through the passage 80 to the outlet port 76. Thus, there will be provided a flow of the heat control medium through the recess 38 in the center plate 22. The heat control medium can be steam for heating the center plate 22 or water for cooling the center plate.

The circular grooves 66 and 68 in the adapter 60 provide universal connections between the ports 74 and 76 and the passages 56 and 58 in the plug 50. These universal connections provide connections between the port 74 and 76 and the passages 58 and 56 no matter how the adapter 60 is rotated with respect to the center plate 22. Thus, after the center plate 22 is mounted in the mold plate 14, the adapter 60 can be rotated to any position which permits ease of securing the hoses to the ports 74 and 76 while still providing the proper connection of the port 74 and 76 to the passages 58 and 56 in the plug. Thus, there is provided by the present invention a center plate 22 through which a heat control medium can be passed to achieve direct control of the heating and cooling of the center plate. In addition, the universal connection between the inlet and outlet ports of the adapter 60 and the passages in the plug 50 provide for ease of connecting the hoses or pipes to the adapter 60 after the center plate 22 is mounted in the lower mold plate 14 without disturbing the flow passages into and out of the recess 38.

I claim:

1. In an apparatus for molding a recorded disc which includes a pair of mold plates having opposed surfaces and central openings therethrough from said opposed surfaces, and a center plate in each of said openings for securing the inner edge of a stamper to the respective mold plate, the improvement comprising one of said center plates having an internal passage for receiving a heat control medium, and inlet and outlet passages extending from the internal passage to a surface of the center plate for permitting the flow of the heat control medium into and out of the internal passage, and an adapter attached to the center plate and having a surface which abuts said surface of the center plate, said adapter having an inlet port, an outlet port and means for universally connecting the inlet and outlet ports to the inlet and outlet passages respectively of the one center plate, said universal connection including a pair of concentric annular grooves in said surface of the adapter, each of said annular grooves being aligned with a separate one of the inlet and outlet passages in the center plate and a separate passage connecting each of said ports to a respective one of the annular grooves.

2. An apparatus in accordance with claim 1 in which said one center plate is a cylindrical body having an internal recess extending from its bottom and to a point spaced from its top end, a plug extends across and is secured within the internal recess adjacent the bottom end of the center plate and the inlet and outlet passages extend through the plug.

3. An apparatus in accordance with claim 2 in which the inlet and outlet passages in the plug are at different radial distances from the center of the plug, and each of the annular grooves in the adapter is of a radius corresponding to the radial distance that its aligned passage is spaced from the center of the plug.

4. An apparatus in accordance with claim 3 including a bolt extending through the center of the adapter and threaded into the center of the plug to secure the adapter to the center plate.

5. A center plate for use in a molding apparatus comprising a cylindrical body having a top surface and an internal recess extending from its bottom and to a point spaced from its top surface, a plug extending across the internal recess and secured to the body adjacent the bottom end of the body, said plug having a pair of spaced passages extending therethrough from its bottom surface, an adapter secured to the plug, said adapter having a pair of spaced ports and a separate universal connection being each of said ports and a separate one of the passages in the plug.

6. A center plate in accordance with claim 5 in which the adapter has a surface which abuts the bottom surface of the plug and the universal connections between the ports of the adapter and the passages in the plug include a pair of concentric, annular grooves in said surface of the adapter and a separate passage through the adapter from each of the ports to a separate one of the grooves.

7. A center plate in accordance with claim 6 in which a bolt extends through the center of the adapter and is threaded with the center of the plug to secure the adapter to the plug.

8. A center plate in accordance with claim 6 in which each of the passages in the plug is spaced from the center of the plug a distance equal to the radius of a separate one of the annular grooves in the adapter.

9. A center plate in accordance with claim 8 including sealing means between the abutting surfaces of the adapter and plug around the largest diameter groove.

* * * * *